United States Patent [19]

Yamamoto et al.

[11] Patent Number: 5,126,391
[45] Date of Patent: Jun. 30, 1992

[54] FILLER-CONTAINING STRETCHED FILM

[75] Inventors: Koji Yamamoto; Shoichi Mori; Tetsuhiko Hashimoto; Hideo Uchiyama, all of Yokkaichi, Japan

[73] Assignee: Mitsubishi Petrochemical Co., Ltd., Tokyo, Japan

[21] Appl. No.: 688,263

[22] Filed: Apr. 22, 1991

[30] Foreign Application Priority Data

Apr. 27, 1990 [JP] Japan ................................. 2-110110
Jun. 18, 1990 [JP] Japan ................................. 2-157688

[51] Int. Cl.$^5$ .................... C08K 5/11; C08L 91/06; C08F 210/02
[52] U.S. Cl. .................... 524/310; 524/311; 524/312; 524/313; 526/348.1
[58] Field of Search ............... 524/310, 311, 314, 317, 524/306, 312, 313; 526/348.1, 348.5

[56] References Cited

U.S. PATENT DOCUMENTS 4,311,752  1/1982  Diedrich et al. ................. 526/348.1
4,405,774  9/1983  Miwa et al. ...................... 526/348.5

FOREIGN PATENT DOCUMENTS 0253667  1/1988  European Pat. Off. .
0011833  1/1976  Japan ................................. 524/310
0165933  12/1980  Japan ................................. 524/310
0015416  1/1984  Japan ................................. 526/348.5

OTHER PUBLICATIONS

World Patents Index Latest, week 8749, 87-345595, & JP-A-62-250038, Oct. 30, 1987.
World Patents Index Latest, Week 8711, 87-075466, & JP-A-62-027438, Feb. 5, 1987.

Primary Examiner—Paul R. Michl
Assistant Examiner—Peter Szekely
Attorney, Agent, or Firm—Oblon, Spivak, McClelland, Maier & Neustadt

[57] ABSTRACT

Disclosed is a filler-containing stretched film composed of a resin composition comprising:

(a) 20 to 80 parts by weight of a linear ethylene copolymer containing 1 to 20% by weight of an α-olefin or diolefin comonomer(s) with 6 or more carbon atoms, having a density of 0.910 to 0.945 g/cm$^3$ and a melt flow rate of 0.01 to 20 g/10 min, and an extracted amount with boiling n-hexane of 20% by weight or less, (b) 80 to 20 parts by weight of a particulate inorganic filler having an average particle size of 10 μm or less and a bulk density of 0.1 to 0.7 g/ml and (c) 0.1 to 15 parts by weight of a saturated or unsaturated aliphatic acid ester having 9 to 40 carbon atoms based on 100 parts by weight of the total amount of Component (a) and Component (b), which film has tear strength MD measured according to ASTM D1922-61T of 10 g or more.

21 Claims, No Drawings

FILLER-CONTAINING STRETCHED FILM

BACKGROUND OF THE INVENTION

This invention relates to a permeable stretched film having excellent tensile strength, appearance, suitability (drape and handle or feeling) and tear resistance.

Permeable films having voids formed by stretching, monoaxially or biaxially, films comprising an olefin type resin and an inorganic filler are known, However, when these films are made thin with a low draw ratio, the film becomes non-uniform and unevenness due to local necking occurs, considerably impairing the commercial value of the film. Therefore, in Japanese Unexamined Patent Publication No. 18435/1987, a composition to which a conventionally known third component as an additive is added has been proposed, and films using this composition have begun to be used for hygienic materials such as disposable diapers.

Although such a resin composition is effective for canceling the above drawbacks, it has a drawback of poor stretchability at the time of molding and tear strength in the case where a film is made thin.

SUMMARY OF THE INVENTION

An object of the present invention is to cancel these drawbacks.

The present inventors have found that by using a specific linear ethylene copolymer, an inorganic filler and a third component (an additive), the above object can be achieved and also various physical properties become well-balanced, to accomplish the present invention.

That is, the present invention is a filler-containing stretched film composed of a resin composition comprising
  (a) 20 to 80 parts by weight of a linear ethylene copolymer containing 1 to 20% by weight of an α-olefin or diolefin comonomer(s) with 6 or more carbon atoms, having a density of 0.910 to 0.945 g/cm$^3$ and a melt flow rate of 0.01 to 20 g/10 min, and an extracted amount with boiling n-hexane of 20% by weight or less,
  (b) 80 to 20 parts by weight of a particulate inorganic filler having an average particle size of 10 μm or less and a bulk density of 0.1 to 0.7 g/ml and
  (c) 0.1 to 15 parts by weight of a saturated or unsaturated aliphatic acid ester having 9 to 40 carbon atoms based on 100 parts by weight of the total amount of Component (a) and Component (b),
which film has tear strength MD measured according to ASTM D1922-61T of 10 g or more.

DESCRIPTION OF THE PREFERRED EMBODIMENTS

The present invention is described in more detail.

The linear ethylene copolymer which is the above Component (a) to be used in the present invention is preferably a linear low-density polyethylene (L-LDPE) having a density of 0.915 to 0.935 g/cm$^3$ and a melt flow rate of 0.1 to 20 g/10 min and containing 2 to 15% by weight of a comonomer(s), and an extracted amount with boiling n-hexane of 15% by weight or less, more preferably L-LDPE having a density of 0.915 to 0.930 g/cm$^3$ and a melt flow rate of 0.1 to 10 g/10 min and containing 2 to 10% by weight of a comonomer(s), and an extracted amount with boiling n-hexane of 10% by weight or less.

Further, particularly preferred is L-LDPE having a density of 0.918 to 0.930 g/cm$^3$ and a melt flow rate of 0.3 to 10 g/10 min and containing 3 to 10% by weight of a comonomer(s), and an extracted amount with boiling n-hexane of 8.5% by weight or less, and most preferred is L-LDPE having a density of 0.920 to 0.930 g/cm$^3$ and a melt flow rate of 0.5 to 3 g/10 min and containing 3 to 10% by weight of a comonomer(s), and an extracted amount with boiling n-hexane of 5% by weight or less.

Here, the density is based on JIS-K6760-1971, the melt flow rate is based on ASTM D1238 (190° C.), and the amount of comonomers contained is measured by infrared spectrophotometric analysis. The amount extracted with boiling n-hexane is measured according to a method described in the following Examples.

If the density is less than the above range, there is a drawback that permeability and blocking resistance of the stretched film are lowered significantly, while it exceeds the above range, there is a drawback that tensile strength, tear strength and suitability of the stretched film are worsened.

If the melt flow rate is less than the above range, there is a drawback that processability is worsened, while it exceeds the above range, there is a drawback that processability and strength of the stretched film are lowered.

If the amount of comonomers to be contained is outside the above range, there is a drawback that strength and rigidity of the stretched film are poor.

If the amount extracted with boiling n-hexane exceeds the above range, permeability and blocking resistance of the stretched film are lowered significantly.

As a comonomer, there may be used α-olefin or diolefin having 6 or more, preferably 6 to 24 carbon atoms. If α-olefin or diolefin having 5 or less carbon atoms is used in place of these comonomers, there is a drawback that stretchability at the time of preparing films and tensile strength and tear strength of the stretched film are deteriorated. Further, above all, a comonomer having a flow ratio (a method for measurement thereof is described below) of 6 to 10 is preferred in the point of tensile strength and tear strength of the stretched film.

Such a copolymer can be obtained by copolymerizing ethylene with one or more comonomers such as hexene-1, 4-methylpentene-1, octene-1, decene-1, dodecene-1, hexadecene-1, docosene-1, 1,5-hexadiene, 1,7-octadiene and 1,9-decadiene. In the case when ethylene and two or more comonomers are copolymerized, as a part of the comonomers, α-olefin or diolefin having 5 or less carbon atoms such as propylene, butene-1 and 1,3-butadiene can be used in an amount which does not impair the effect of the present invention significantly. As a method for preparing the copolymer, there may be used the method in which ethylene and the above α-olefin are copolymerized under conditions of a pressure of 5 to 2,500 kg/cm$^2$ and a temperature of 50° to 300° C. by using a Ziegler type, vanadium type or Kaminsky type catalyst. For example, the method disclosed in Japanese Patent Publication No. 18132/1981 has been known.

In the present invention, for improving particularly tear strength MD and film appearance of the stretched film obtained, a granular or powdery linear ethylene copolymer is preferably used, and a granular or powdery linear ethylene copolymer preferably having an average particle size of 0.001 to 0.7 mm, more preferably 0.01 to 0.6 mm and comprising 70% by weight or more of a copolymer having a particle size distribution of 1.68 mm or less, 50% by weight or more of a copolymer having a particle size distribution of 0.84 mm or less and 1.5% by weight or more of a copolymer having a particle size distribution of 0.21 mm or less, more preferably comprising 70% by weight or more of a copolymer having a particle size distribution of 1.68 mm or less, 50% by weight or more of a copolymer having a particle size distribution of 0.84 mm or less and 10% by weight or more of a copolymer having a particle size distribution of 0.21 mm or less.

Here, the average Particle size and the particle size distribution are measured according in the following method.

(Definition) A linear ethylene copolymer is fractionated in accordance with the particle size by using a regular screen with various specifications and its weight distribution is made the particle distribution. Also, an average particle size is determined by the weighted average screen size calculated from respective weight percentages of screen size fractionated.

(Device and Instrument)

(1) Shaking apparatus
(2) Standard screen: according to JIS Z-8801 (#3, 5, 10.5, 20, 32, 48, 70, 145, 200, 350 and receiving apparatus)
(3) Even balance (Test method)

(1) After cleaning the standard screens and the receiving apparatus to be used by using hair brush, they are cleaned by air blow.
(2) Weights of each screen and the receiving apparatus are measured (w1). Each screen is put together from finer one placing the receiving apparatus at the bottom thereof.
(3) One hundred grams ±5 g of a sample are weighed by an even balance (w2), and the sample is charged into the uppermost screen.
(4) The screens are fixed at a shaking apparatus, and shaked for 15 minutes.
(5) The screens are taken out and weights of each screen in which the sample is placed and the receiving apparatus are measured (w).

(Calculating method)

1. Particle size distribution

Weight percentages of fractionated materials in each screen are calculated from the following equation.

$$W = (w - w1)/w2 \times 100$$

wherein
W: weight percent (wt %) of fractionated material in each screen,
w: weight of each screen and the receiving device including fractionated samples after shaking (g),
w1: weight of each screen and the receiving apparatus (g),
w2: total weight of the sample (g).

2. Average particle size

The average particle size is obtained by the following equation using weight percentages of fractionated materials in each screen.

$$D = \Sigma(Wn \times dn)/100$$

wherein
D: average particle size (mm) of the sample,
Wn: weight percentage of the fractionated material in each screen (wt %),
dn: size (mm) of divisions of each screen.

As a comonomer constituting the linear ethylene copolymer, a straight α-olefin or diolefin is preferably used since tear strength MD of the stretched film obtained becomes extremely larger when compared with the case where a non-straight (branched) α-olefin or diolefin is used.

Component (b) to be used in the present invention is a particulate inorganic filler having an average particle size of 10 μm or less, preferably 0.1 to 5 μm, more preferably 0.5 to 2 μm and having a bulk density of 0.1 to 0.7 g/ml, preferably 0.2 to 0.5 g/ml, more preferably 0.3 to 0.5 g/ml. Here, the average particle size is obtained by measuring a specific surface area according to the air permeation method and calculating the value in accordance with the following formula:

$$dm = \frac{60,000}{\rho \cdot Sw}$$

wherein dm: avarage particle size (μm), ρ: true specific gravity of powder material (g/cm³) and Sw: specific surface area of the powder material.

As the measuring device of the specific surface area, there may be used, for example, Shimadzu Powder Specific Surface Area Measurement Device SS-100 Type and the specific surface area can be calculated by applying to the Kozeny-Carman's formula. Also, the bulk density can be measured according to JIS-K5101.

If the average particle size exceeds the above range, appearance of the stretched film is worsened, and further when a thin stretched film having a thickness of 100 μm or less is prepared, holes are made and unevenness in stretching is caused to impair stable stretchability. If the bulk density is less than the above range, permeability of the stretched film is lowered, while it exceeds the above range, tensile strength is impaired. "Particulate" refers to a shape such as a sphere, a square or a shape similar thereto, not to a shape such as a needle and a plate. If the shape of the inorganic filler is a needle, a rod or a plate, satisfactory microvoids in the stretched film cannot be obtained.

As such an inorganic filler, there may be included calcium carbonate, calcium oxide, zeolite, non-crystalline aluminosilicate, clay, synthetic silica, titanium oxide, alumina, barium sulfate, aluminum sulfate and magnesium hydroxide. Among them, preferred are calcium carbonate, zeolite, noncrystalline aluminosilicate, barium sulfate, synthetic silica and magnesium hydroxide, and particularly preferred are calcium carbonate and barium sulfate. These inorganic fillers can be used alone or in combination of two or more. The water content cf the inorganic filler (b) is 3,000 ppm or less, preferably 1,000 ppm or less. If the water content exceeds the above range, foaming phenomenon is liable to occur, whereby stable molding of films can be performed with difficulty and tint failure or appearance failure of films is caused, or second agglomeration of the filler is liable to occur, whereby appearance failure and stretching failure tend to occur easily.

Component (c) to be used in the present invention is a saturated or unsaturated aliphatic acid ester having 9 to 40 carbon atoms. As the unsaturated aliphatic acid ester, there may be specifically mentioned, for example, (poly)ethylene glycol oleate, (poly)propylene glycol oleate, glyceryl oleate, sorbitan oleate, (poly)ethylene glycol sorbitan oleate, butyl oleate, pinacol oleate, m-cresol oleate, pentaerythritol oleate, glyceryl linolenate, glyceryl ricinoleate, methyl ricinoleate, ethyl ricinoleate, butyl ricinoleate, methylacetyl ricinoleate, ethylacetyl ricinoleate, butylacetyl ricinoleate, (poly)ethylene glycol ricinoleate, glyceryl acetyl ricinoleate and glyceryl erucinate. Among them, glyceryl hydroxyaliphatic acid ester is preferred, and glyceryl ricinoleate is particularly preferred.

As a specific example of the saturated ester, there may be mentioned polyethylene glycol laurate, polypropylene glycol laurate, glyceryl laurate, sorbitan laurate, polyethylene glycol sorbitan laurate, glyceryl myristate, glyceryl palmitate, butyl stearate, ethylene glycol stearate, propylene glycol stearate, pinacol stearate, m-cresol stearate, polyethylene glycol stearate, polypropylene glycol stearate, glyceryl stearate, pentaerythritol stearate, sorbitan stearate, polyethylene glycol sorbitan stearate, methyl hydroxystearate, ethyl hydroxystearate, butyl hydroxystearate, methylacetyl hydroxystearate, ethylacetyl hydroxystearate, butylacetyl hydroxystearate, ethylene glycol hydroxystearate, propylene glycol hydroxystearate, pinacol hydroxystearate, m-cresol hydroxystearate, polyethylene glycol hydroxystearate, polypropylene glycol hydroxystearate, pentaerythritol hydroxystearate, sorbitan hydroxystearate, ethylene glycol sorbitan hydroxystearate, glyceryl hydroxystearate and glyceryl acetyl hydroxystearate. Among them, preferred are glyceryl hydroxy saturated aliphatic acid esters such as ethylene glycol hydroxystearate, propylene glycol hydroxystearate, pinacol hydroxystearate, m-cresol hydroxystearate, polyethylene glycol hydroxystearate, polypropylene glycol hydroxystearate, pentaerythritol hydroxystearate, sorbitan hydroxystearate, ethylene glycol sorbitan hydroxystearate, glyceryl hydroxystearate and glyceryl acetyl hydroxystearate, and most preferred is glyceryl hydroxystearate.

As the aliphatic acid ester, a saturated ester is preferably used since smoking scarcely occurs at the time of molding and also the stretched film obtained is excellent in odorless characteristics when compared with the case where an unsaturated ester is used.

The formulation ratio of these respective Components (a), (b) and (c) is described. The formulation ratios of Component (a) and Component (b) are 20 to 80 parts by weight of Component (a) and 80 to 20 parts by weight of Component (b), preferably 30 to 70 parts by weight of Component (a) and 70 to 30 parts by weight of Component (b), more preferably 35 to 60 parts by weight of Component (a) and 65 to 40 parts by weight of Component (b) based on the total amount of Component (a) and Component (b). The formulation ratio of Component (c) is 0.1 to 15 parts by weight, preferably 0.5 to 7 parts by weight more preferably 1 to 5 parts by weight per 100 parts by weight of the total amount of Component (a) and component (b).

If the formulation ratio of Component (b) is less than the above range, there is a drawback that permeability and suitability of the stretched film are lowered, while it exceeds the above range, there is a drawback that stretchability at the time of preparing films, or tensile strength and tear strength of the stretched film are lowered to impair the commercial value.

If the formulation ratio of Component (c) is less than the above range, when films are so manufactured to be thin and to have low draw ratio, the thickness becomes ununiform and uneveness occurs due to local necking, whereby the commercial value is impaired remarkably, while it exceeds the above range, processability is lowered, and permeability and blocking resistance of the stretched film are lowered undesirably.

For particularly improving balance of tensile strength, permeability, appearance, suitability, stretchability and tear strength of the stretched film, it is desired to use a composition prepared in such an order that as Component (a), the granular or powdery copolymer described above is used, Component (a) and Component (b) are mixed sufficiently by a blender such as a Henschel mixer, to this mixture was further added Component (c) and mixed, and the mixture obtained is melted and kneaded by a biaxial kneading extruder, a Banbury mixer a kneader, followed by pelletization.

In the present invention, additives which are generally used in the composition, such as an antioxidant, a stabilizer, a dispersing agent, a lubricant, an anti-blocking agent, a pigment, an anti-fogging agent, an antistatic agent, an UV absorber, a light stabilizer and a nucleating agent may be formulated.

Further, a composition in which a resin and a rubber component other than the above copolymer which is Component (a), such as a copolymer of ethylene and α-olefin or diolefin having 5 or less carbon atoms, high-pressure low-density polyethylene, high-density polyethylene, polypropylene, polybutene and an ethylene-vinyl acetate copolymer are blended in an amount within the range which does not impair the effect of the present invention significantly can be also applied to the present invention.

The stretched film can be prepared by molding the composition to be used in the present invention to be made a film, a sheet or a tape and stretching it monoaxially or biaxially at a normal drawing temperature. This stretching method may be a known method in the art. Specifically, for monoaxial stretching, there may be included flat roll stretching, oven stretching or tubular stretching, and for biaxial stretching, there may be included flat tentering stretching, tubular inflation stretching or mandrel stretching. The draw ratio is suitably 1.2 to 6.0 times, preferably 1.2 to 4.0 times.

The thickness of the stretched film obtained is practically 5 to 300 μm, preferably 10 to 50 μm practically.

The stretched film thus obtained is required to have a tear strength MD according to ASTM D1922-61T of 10 g or more, preferably 15 g or more, particularly preferably 20 g or more. If the stretched film has a tear strength MD less than the above value, the film cannot be applied satisfactorily to the use which is the object of the present invention desirably.

According to the present invention, stretchability of the film is good, and the stretched film obtained is particularly excellent in tear strength, of which tensile strength, permeability, appearance and suitability are well-balanced. Thus, the stretched film of the present invention is useful as hygienic materials such as paper diapers, sanitary goods and cloths for medical use and also building materials such as a dew condensation preventing material.

When a saturated aliphatic acid ester is used as the above Component (c), smoking scarcely occurs at the time of molding and also the stretched film obtained is excellent in odorless characteristics.

EXAMPLES

The present invention is described in detail by referring to Examples and Comparative examples.

Examples 1 to 3

Ethylene polymers (Component (a)), inorganic fillers (Component (b)) and esters (Component (c)) shown in Table 1 were used. First, Components (a) and (b) were mixed by a Henschel mixer, and Component (c) was added thereto and mixed. The mixture was extruded by using a biaxial kneading extruder (screw diameter: 65 mm) at a temperature of 200° C. to obtain pellets of a composition. This composition was processed into a film according to the following method.

The composition was extruded into a film by using an extruder (screw diameter: 50 mm, L/D: 24) and a slot case die (width: 300 mm, lip width: 1.2 mm) at 230° C., and the film was stretched monoaxially by a short interval hot drawing roll at a drawing temperature of 85° C. and a draw ratio of 3 times to prepare permeable film having a thickness of 30 μm.

The quality of the film thus obtained was evaluated in the following items. Methods for measurements are described below. The results of the evaluation are shown in Table 2.

The melt flow rate (MFR) was measured according to ASTM D1238 (190° C.), the flow ratio (FR) was measured according to JIS K7210-1975 (190° C.) and determined by using a melt indexer according to the following formula:

$$FR = \frac{MFR \text{ at a load of 10 kg}}{MFR \text{ at a load of 2.16 kg}}$$

The average particle size of the filler was a value determined according to a coal tar counter method (dispersion is effected at an ultrasonic wave of 28 KC for 5 minutes by using 0.01% sodium hexametaphosphate).

(1) Amount extracted with boiling n-hexane

After 5 g of a film extruded by air-cooling inflation molding at 200° C. to have a film thickness of 30 μm was placed in a thimble, extraction was performed by a Soxhlet extractor charged with 200 ml of n-hexane at a boiling point for 8 hours. After this thimble was dried by a vacuum dryer for 60 minutes, a reduced amount thereof was measured.

(2) Stretchability (maximum draw ratio)

The composition was extruded into a film by using an extruder (screw diameter: 50 mm, L/D: 24) and slot cast die (width: 300 mm, lip width: 1.2 mm) at 230° C., and the film was stretched monoaxially by a short interval hot drawing roll at a drawing temperature of 85° C. to measure a maximum draw ratio at which the film was cut.

(3) Tensile strength

The tensile strength was measured according to ASTM D882-67.

(4) Permeability

The permeability was measured according to JIS Z0208-1973.

(5) Tear strength MD (machine direction: longitudinal direction)

The tear strength was measured according to ASTM D1922-61T.

(6) Odor

The film formed was cut into pieces, and 30 g of the film piece was put in a conical flask to evaluate the odor by a sensory test.

A: Almost no odor B: Slight odor C: Odor (7) Smoking

The presence or absence of smoking at the time of molding films was evaluated.

(8) Film appearance test

The appearance abnormalities (streak, ununiformity, granular structure, etc.) of a surface of the film formed were observed with eyes.

A: Good B: Slightly bad C: Extremely bad

Comparative examples 1 to 7

In the same manner as in Examples 1 to 3 except for changing the components as shown in Table 1, films were obtained. The quality of the films thus obtained was evaluated in the same manner as in Examples 1 to 3. The results of the evaluation are shown in Table 2.

TABLE 1

| | | Example | | Comparative example | | | | | | Example | Comparative example |
|---|---|---|---|---|---|---|---|---|---|---|---|
| | | 1 | 2 | 1 | 2 | 3 | 4 | 5 | 6 | 3 | 7* |
| Component (a) | | | | | | | | | | | |
| Density | g/cm³ | .924 | .924 | .924 | .900 | .950 | .924 | .924 | .924 | .924 | .924 |
| MFR | g/10 min | 1.0 | 1.0 | 1.0 | 1.0 | 1.0 | 1.0 | 1.0 | 1.0 | 1.0 | 4.0 |
| Kind of comonomer (α-olefin) | — | $C_6$ | $C_6$ | $C_4$ | $C_6$ | $C_4$ | $C_6$ | $C_6$ | $C_6$ | $C_6$ | — |
| Content of comonomer | % by weight | 7 | 7 | 7 | 21 | 1 | 7 | 7 | 7 | 7 | — |
| Amount extracted with n-hexane | % by weight | 4.6 | 4.6 | 4.2 | 35 | 1.2 | 4.6 | 4.6 | 4.6 | 4.6 | 7.0 |
| FR | — | 7.5 | 7.5 | 7.3 | 8.3 | 8.5 | 7.5 | 7.5 | 7.5 | 7.5 | 15.0 |
| Average particle size | mm | 0.59 | 0.59 | 0.59 | 0.62 | 0.55 | 0.59 | 0.59 | 0.59 | 0.59 | 0.47 |
| Particle size distribution | % by weight | | | | | | | | | | |
| 1.68 mm or less | | 76.1 | 76.1 | 74.2 | 74.8 | 78.5 | 76.1 | 76.1 | 76.1 | 76.1 | 86.3 |
| 0.84 mm or less | | 65.0 | 65.0 | 66.2 | 63.5 | 68.9 | 65.0 | 65.0 | 65.0 | 65.0 | 70.4 |
| 0.21 mm or less | | 35.0 | 35.0 | 33.0 | 31.0 | 38.5 | 35.0 | 35.0 | 35.0 | 35.0 | 43.4 |
| Amount formulated | parts by weight | 40 | 45 | 40 | 40 | 40 | 40 | 40 | 40 | 37 | 40 |
| Component (b) | | | | | | | | | | | |
| Kind | — | CC | CC | CC | CC | CC | CC | CC | CC | BS | CC |
| Average particle size | μm | 1.0 | 1.0 | 1.0 | 1.0 | 1.0 | 1.0 | 1.0 | 1.0 | 0.8 | 1.0 |
| Bulk density | g/ml | 0.4 | 0.4 | 0.4 | 0.4 | 0.4 | 0.4 | 0.4 | 0.4 | 0.3 | 0.4 |

TABLE 1-continued

|  |  | Example | | Comparative example | | | | | | Example | Comparative example |
|---|---|---|---|---|---|---|---|---|---|---|---|
|  |  | 1 | 2 | 1 | 2 | 3 | 4 | 5 | 6 | 3 | 7* |
| Amount formulated Component (c) | parts by weight | 60 | 55 | 60 | 60 | 60 | 60 | 60 | 60 | 63 | 60 |
| Kind | — | — | A | A | A | A | A | — | B | C | A | A |
| Part by weight | — | — | 3.0 | 3.0 | 3.0 | 3.0 | 3.0 | — | 3.0 | 3.0 | 2.0 | 3.0 |

Notes:
C₆: 1-hexene. C₄: 1-butene
CC: calcium carbonate. BS: barium sulfate
A: glyceryl trihydroxystearate (castor wax)
B: glyceryl triricinoleate (castor oil).
C: hydroxystearic acid
A was prepared by hydrogenating B and saturating an unsaturated bond.
*: Component (a) in Comparative example 7 was prepared according to high-pressure radical polymerization.

TABLE 2

|  |  | Example | | Comparative example | | | | | | Example | Comparative example |
|---|---|---|---|---|---|---|---|---|---|---|---|
|  |  | 1 | 2 | 1 | 2 | 3 | 4 | 5 | 6 | 3 | 7* |
| Stretchability | Maximum degree | 4.5 | 4.8 | 3.8 | 5.4 | 7.5 | 3.7 | 4.3 | 3.9 | 5.1 | unstretchable |
| Tensile strength TD breaking point | g/15 mm width | 700 | 1020 | 490 | 950 | 1020 | 450 | 680 | 620 | 1390 | — |
| Permeability | g/m² · 24 hr | 6440 | 5580 | 6250 | 830 | 6580 | 4810 | 6080 | 5200 | 5440 | — |
| Tear strength MD | g | 13 | 17 | 3 | 16 | 1 | 6 | 13 | 8 | 17 | — |
| Odor | — | A | A | A | A | A | A | C | C | A | — |
| Smoking | — | None | None | None | None | None | None | Found | Found | None | None |
| Film appearance | — | A | A | B | A | B | C | A | B | A | — |

Note:
TD: transverse direction

Examples 4 to 8

The film was evaluated in the same manner as in Example 1 except for using ethylene polymers having various particle size distributions shown in Table 3 in place of the ethylene polymers (Component (a)) used in Example 1. The results of the evaluation are shown in Table 3.

Comparative examples 8 to 13

In the same manner as in Examples 4 to 8 except for changing the components as shown in Table 3, films were obtained. The quality of the films thus obtained was evaluated in the same manner as in Examples 4 to 8. The results of the evaluation are shown in Table 3.

TABLE 3

|  |  | Example | | | | | Comparative example | | | | | |
|---|---|---|---|---|---|---|---|---|---|---|---|---|
|  |  | 4 | 5 | 6 | 7 | 8 | 8 | 9 | 10 | 11 | 12 | 13* |
| Component (a) | | | | | | | | | | | | |
| Density | g/cm³ | .924 | .924 | .924 | .924 | .924 | .924 | .924 | .924 | .924 | .924 | .920 |
| MFR | g/10 min | 1.0 | 1.0 | 1.0 | 1.0 | 1.0 | 1.0 | 1.0 | 1.0 | 1.0 | 1.0 | 2.1 |
| Kind of comonomer (α-olefin) | — | C₆ | C₆ | C₆ | C₆ | C₆ | C₆ | C₆ | C₆ | C₆ | C₆ | 4 MP |
| Content of comonomer | % by weight | 7 | 7 | 7 | 7 | 7 | 7 | 7 | 7 | 7 | 7 | 9 |
| Amount extracted with n-hexane | % by weight | 4.6 | 4.6 | 4.6 | 4.6 | 4.6 | 4.6 | 4.6 | 4.6 | 4.6 | 4.6 | 4.2 |
| FR | — | 7.5 | 7.5 | 7.5 | 7.5 | 7.5 | 7.5 | 7.5 | 7.5 | 7.5 | 7.5 | 7.0 |
| Average particle size | mm | 0.24 | 0.21 | 0.34 | 0.38 | 0.60 | 0.77 | 0.69 | 0.77 | 0.94 | 1.25 | 1.68 |
| Particle size distribution | % by weight | | | | | | | | | | | |
| 1.68 mm or less |  | 100 | 100 | 99.5 | 92.9 | 75.1 | 64.2 | 81.2 | 75.6 | 50.4 | 50.8 | 0 |
| 0.84 mm or less |  | 95.4 | 97.7 | 79.6 | 81.7 | 65.3 | 56.9 | 52.2 | 43.6 | 48.5 | 0 | 0 |
| 0.21 mm or less |  | 1.8 | 16.3 | 1.7 | 4.0 | 32.6 | 3.0 | 0.5 | 1.8 | 8.2 | 0 | 0 |
| Stretchability | Maximum degree | 5.7 | 5.8 | 5.3 | 4.7 | 4.8 | 4.1 | 4.2 | 4.3 | 4.1 | 3.9 | 3.1 |
| Tensile strength | | | | | | | | | | | | |
| TD breaking point | g/15 mm width | 1160 | 1180 | 1150 | 1020 | 900 | 710 | 750 | 790 | 730 | 670 | 480 |
| Permeability | g/m² · 24 hr | 6450 | 6480 | 6270 | 5710 | 5810 | 4020 | 4310 | 3810 | 3760 | 3780 | 3300 |
| Tear strength MD | g | 23 | 26 | 22 | 16 | 12 | 6 | 8 | 7 | 6 | 5 | 3 |

TABLE 3-continued

|  | Example | | | | | Comparative example | | | | | |
| --- | --- | --- | --- | --- | --- | --- | --- | --- | --- | --- | --- |
|  | 4 | 5 | 6 | 7 | 8 | 8 | 9 | 10 | 11 | 12 | 13* |
| Film appearance | — | A | A | A | A | B | C | C | C | C | C | D |

Note:
4 MP: 4-methylpentene-1
*: pellet, "Ultozex 2020" (trade name), manufactured by Mitsui Sekiyu Kagaku Kogyo K.K.
Component (b) and Component (c) were the same as in Example 1.

Examples 9 to 11

The film was evaluated in the same manner as in Example 1 except for using ethylene polymers having various particle size distributions shown in Table 4 in place of the ethylene polymers (Component (a)) used in Example 1. The results of the evaluation are shown in Table 4 together with the results in Examples 5, 7 and 8 and Comparative example 13 for comparison regarding the kind of the comonomers.

Comparative examples 14 and 15

In the same manner as in Examples 9 to 11 except for changing the components as shown in Table 4, films were obtained. The quality of the films thus obtained was evaluated in the same manner as in Examples 9 to 11. The results of the evaluation are shown in Table 4.

TABLE 4

|  |  | Example | | | | Comparative example | Example | Comparative example | | Example |
| --- | --- | --- | --- | --- | --- | --- | --- | --- | --- | --- |
|  |  | 9 | 5 | 10 | 7 | 14 | 8 | 13 | 15 | 11 |
| Component (a) Density | g/cm$^3$ | .920 | .924 | .920 | .924 | .920 | .924 | .920 | .924 | .920 |
| MFR | g/10 min | 2.1 | 1.0 | 2.1 | 1.0 | 2.1 | 1.0 | 2.1 | 1.0 | 1.0 |
| Kind of comonomer (α-olefin) | — | 4 MP | $C_6$ | 4 MP | $C_6$ | 4 MP | $C_6$ | 4 MP | $C_6$ | $C_8$ |
| Content of comonomer | % by weight | 9 | 7 | 9 | 7 | 9 | 7 | 9 | 7 | 9 |
| Amount extracted with n-hexane | % by weight | 4.2 | 4.6 | 4.2 | 4.6 | 4.2 | 4.6 | 4.2 | 4.6 | 4.5 |
| FR | — | 7.0 | 7.5 | 7.0 | 7.5 | 7.0 | 7.5 | 7.0 | 7.5 | 8.5 |
| Average particle size | mm | 0.20 | 0.21 | 0.39 | 0.38 | 0.54 | 0.60 | 1.68 | 1.68 | 0.41 |
| Particle size distribution | % by weight | | | | | | | | | |
| 1.68 mm or less |  | 100 | 100 | 92.3 | 92.9 | 78.8 | 75.1 | 0 | 0 | 91.7 |
| 0.84 mm or less |  | 98.1 | 97.7 | 80.5 | 81.7 | 69.7 | 65.3 | 0 | 0 | 79.3 |
| 0.21 mm or less |  | 16.8 | 16.3 | 4.3 | 4.0 | 38.3 | 32.6 | 0 | 0 | 3.8 |
| Stretchability | Maximum degree | 4.6 | 5.8 | 4.1 | 4.7 | 3.8 | 4.8 | 3.1 | 3.7 | 4.2 |
| Tensile strength TD breaking point | g/15 mm width | 1120 | 1180 | 1080 | 1020 | 930 | 1080 | 780 | 980 | 1200 |
| Permeability | g/m$^2$ · 24 hr | 5850 | 6480 | 4480 | 5710 | 3780 | 5810 | 3300 | 4010 | 5810 |
| Tear strength MD | g | 18 | 26 | 11 | 16 | 8 | 12 | 3 | 5 | 15 |
| Film appearance | — | A | A | A | A | B | B | D | D | A |

Note:
$C_8$: 1-octene
Component (b) and Component (c) were the same as in Example 1.

Examples 12 and 13

By using ethylene polymers (Component (a)), inorganic fillers (Component (b) and esters (Component (c)) shown in Table 5, the film was evaluated in the same manner as in Example 1. The results of the evaluation are shown in Table 6.

Comparative examples 16 to 18

In the same manner as in Examples 12 and 13 except for changing the components as shown in Table 5, films were obtained. The quality of the films thus obtained was evaluated in the same manner as in Examples 12 and 13. The results of the evaluation are shown in Table 6.

TABLE 5

|  |  | Example | | Comparative example | | |
| --- | --- | --- | --- | --- | --- | --- |
|  |  | 12 | 13 | 16 | 17 | 18 |
| Component (a) |  |  |  |  |  |  |
| Density | g/cm$^3$ | 0.926 | 0.926 | 0.900 | 0.924 | 0.940 |
| MFR | g/10 min | 0.8 | 0.8 | 1.0 | 1.0 | 1.0 |
| Kind of comonomer (α-olefin) | — | $C_6$ | $C_6$ | $C_6$ | $C_4$ | $C_6$ |
| Content of comonomer | % by weight | 6 | 6 | 21 | 5 | 1.5 |
| Amount extracted with n-hexane | % by weight | 3.6 | 3.6 | 35 | 4.2 | 1.9 |
| FR | — | 7.8 | 7.8 | 9.1 | 7.3 | 8.1 |

TABLE 5-continued

|  |  | Example | | Comparative example | | |
|---|---|---|---|---|---|---|
|  |  | 12 | 13 | 16 | 17 | 18 |
| Average particle size | mm | 0.38 | 0.38 | 0.58 | 0.61 | 0.34 |
| Particle size distribution | % by weight |  |  |  |  |  |
| 1.68 mm or less |  | 92.9 | 92.9 | 74.8 | 74.2 | 99.5 |
| 0.84 mm or less |  | 81.7 | 81.7 | 68.9 | 66.2 | 79.6 |
| 0.21 mm or less |  | 4.0 | 4.0 | 38.5 | 33.0 | 6.4 |
| Amount formulated | parts by weight | 45 | 40 | 40 | 40 | 40 |
| Component (b) |  |  |  |  |  |  |
| Kind | — | $CaCO_3$ | $BaSO_4$ | $CaCO_3$ | $CaCO_3$ | $CaCO_3$ |
| Average particle size | μm | 1.0 | 0.8 | 1.0 | 1.0 | 1.0 |
| Bulk density | — | 0.5 | 0.3 | 0.5 | 0.5 | 0.5 |
| Amount formulated | parts by weight | 55 | 60 | 60 | 60 | 60 |
| Component (c) |  |  |  |  |  |  |
| Kind | — | B | B | B | B | B |
| Part by weight | — | 3.0 | 1.0 | 3.0 | 3.0 | 3.0 |

Note:
B: glyceryl triricinoleate

TABLE 6

|  |  | Example | | Comparative example | | |
|---|---|---|---|---|---|---|
|  |  | 12 | 13 | 16 | 17 | 18 |
| Stretchability | Maximum degree | 5.3 | 5.1 | 5.4 | 3.8 | 7.0 |
| Tensile strength TD breaking point | g/15 mm width | 1150 | 1250 | 950 | 490 | 980 |
| Permeability | $g/m^2 \cdot 24$ hr | 6320 | 5100 | 830 | 6250 | 6580 |
| Tear strength MD | g | 22 | 21 | 16 | 3 | 2 |
| Film appearance | — | A | A | A | B | B |

We claim:

1. A filler-containing permeable stretched film composed of a resin composition comprising:
   (a) 20 to 80 parts by weight of a linear ethylene copolymer containing 1 to 20% by weight of an α-olefin or diolefin comonomer(s) with 6 or more carbon atoms, having a density of 0.910 to 0.945 g/cm³ and a melt flow rate of 0.01 to 20 g/10 min, and an extracted amount with boiling n-hexane of 20% by weight or less,
   (b) 80 to 20 parts by weight of a particulate inorganic filler having an average particle size of 10 μm or less and a bulk density of 0.1 to 0.7 g/ml and
   (c) 0.1 to 15 parts by weight of a glyceryl hydroxy saturated or unsaturated aliphatic acid ester having 9 to 40 carbon atoms based on 100 parts by weight of the total amount of Component (a) and Component (b) which has a thickness of 5 to 300 μm and tear strength MD measured according to ASTM D1922 -61T of 10 g or more.

2. The film according to claim 1, wherein the linear ethylene copolymer is a linear low-density polyethylene having a density of 0.915 to 0.935 g/cm³ and a melt flow rate of 0.1 to 20 g/10 min and containing 2 to 15% by weight of a comonomer, of which an extracted amount with boiling n-hexane is 15% by weight or less.

3. The film according to claim 1, wherein the linear ethylene copolymer is a linear low-density polyethylene having a density of 0.915 to 0.930 g/cm³ and a melt flow rate of 0.1 to 10 g/10 min and containing 2 to 10% by weight of a comonomer, of which an extracted amount with boiling n-hexane is 10% by weight or less.

4. The film according to claim 1, wherein the linear ethylene copolymer is a linear low-density polyethylene having a density of 0.918 to 0.930 g/cm³ and a melt flow rate of 0.3 to 10 g/10 min and containing 3 to 10% by weight of a comonomer, of which an extracted amount with boiling n-hexane is 8.5% by weight or less.

5. The film according to claim 1, wherein the linear ethylene copolymer is a linear low-density polyethylene having a density of 0.920 to 0.930 g/cm³ and a melt flow rate of 0.5 to 3 g/10 min and containing 3 to 10% by weight of a comonomer, of which an extracted amount with boiling n-hexane is 5% by weight or less.

6. The film according to claim 1, wherein the linear ethylene copolymer is a granular or powdery copolymer having an average particle size of 0.001 to 0.7 mm and comprising 70% by weight or more of a copolymer having a particle size distribution of 1.68 mm or less, 50% by weight or more of a copolymer having a particle size distribution of 0.84 mm or less and 1.5% by weight or more of a copolymer having a particle size distribution of 0.21 mm or less.

7. The film according to claim 1, wherein the linear ethylene copolymer is a granular or powdery copolymer having an average particle size of 0.01 to 0.6 mm and comprising 70% by weight or more of a copolymer having a particle size distribution of 1.68 mm or less, 50% by weight or more of a copolymer having a particle size distribution of 0.84mm or less and 10% by weight or more of a copolymer having a particle size distribution of 0.21 mm or less.

8. The film according to claim 1, wherein the α-olefin or diolefin is a straight α-olefin or diolefin.

9. The film according to claim 1, wherein the inorganic filler is a particulate inorganic filler having an average particle size of 0.1 to 5 μm and a bulk density of 0.2 to 0.6 g/ml.

10. The film according to claim 1, wherein the inorganic filler is a particulate inorganic filler having an average particle size of 0.5 to 2 μm and a bulk density of 0.3 to 0.5 g/ml.

11. The film according to claim 1, wherein the inorganic filler is at least one filler selected from the group consisting of calcium carbonate, zeolite, non-crystalline aluminosilicate, barium sulfate, synthetic silica and magnesium hydroxide.

12. The film according to claim 1, wherein the inorganic filler is calcium carbonate or barium sulfate.

13. The film according to claim 1, wherein the glyceryl hydroxyaliphatic acid ester is glyceryl ricinoleate.

14. The film according to claim 1, wherein the glyceryl hydroxy saturated aliphatic acid ester is glyceryl hydroxystearate.

15. The film according to claim 1, wherein the amounts of the linear ethylene copolymer and the inorganic filler to be formulated are 30 to 70 parts by weight of the linear ethylene copolymer and 70 to 30 parts by weight of the inorganic filler based on the total amount of the both components.

16. The film according to claim 1, wherein the amounts of the linear ethylene copolymer and the inorganic filler to be formulated are 35 to 60 parts by weight of the linear ethylene copolymer and 65 to 40 parts by weight of the inorganic filler based on the total amount of the both components.

17. The film according to claim 1, wherein the amount of the aliphatic acid ester to be formulated is 0.5 to 7 parts by weight per 100 parts by weight of the total amount of the linear ethylene copolymer and the inorganic filler.

18. The film according to claim 1, wherein the amount of the aliphatic acid ester to be formulated is 1 to 5 parts by weight per 100 parts by weight of the total amount of the linear ethylene copolymer and the inorganic filler.

19. The film according to claim 1, wherein the thickness is 10 to 50 μm.

20. The film according to claim 1, wherein the tear strength MD is 15 g or more.

21. The film according to claim 1, wherein the tear strength MD is 20 g or more.

* * * * *